US012378095B2

(12) United States Patent
Chmiel et al.

(10) Patent No.: US 12,378,095 B2
(45) Date of Patent: Aug. 5, 2025

(54) SYSTEM AND METHOD OF UNLOCKING AND OPENING MULTIPLE PANEL ELEVATOR DOORS

(71) Applicant: Otis Elevator Company, Farmington, CT (US)

(72) Inventors: James Chmiel, Suffield, CT (US); Michael Tracey, Cromwell, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/537,026

(22) Filed: Dec. 12, 2023

(65) Prior Publication Data

US 2025/0187877 A1 Jun. 12, 2025

(51) Int. Cl.
*B66B 13/06* (2006.01)
*B66B 11/02* (2006.01)
*B66B 13/30* (2006.01)

(52) U.S. Cl.
CPC .............. *B66B 13/06* (2013.01); *B66B 11/02* (2013.01); *B66B 13/30* (2013.01)

(58) Field of Classification Search
CPC ......... B66B 13/06; B66B 11/02; B66B 13/30; B66B 13/12
See application file for complete search history.

(56) References Cited

U.S. PATENT DOCUMENTS 4,785,579 A * 11/1988 Sugiyama ........... E05D 15/0604 49/141

FOREIGN PATENT DOCUMENTS

| | | | | |
|---|---|---|---|---|
| EP | 2177467 A1 | * | 4/2010 | ............. B66B 11/02 |
| JP | 10139318 A | * | 5/1998 | |
| KR | 101431719 B1 | * | 8/2014 | |
| KR | 101928993 B1 | * | 12/2018 | |

* cited by examiner

*Primary Examiner* — Diem M Tran
(74) *Attorney, Agent, or Firm* — CANTOR COLBURN LLP

(57) ABSTRACT

A landing arrangement of an elevator system includes a plurality of landing bays, at least two landing bays of the plurality of landing bays overlapping, and a plurality of landing door sets. Each landing door set of the plurality of landing door sets corresponds to a landing bay of the plurality of landing bays. At least two landing door sets of the plurality of landing door sets are interconnected such that opening a first landing door set of the plurality of landing door sets urges the at least partial opening of a second landing door set adjacent to the first landing door set.

17 Claims, 6 Drawing Sheets

SYSTEM AND METHOD OF UNLOCKING AND OPENING MULTIPLE PANEL ELEVATOR DOORS

BACKGROUND

The embodiments herein relate to elevator systems, and in particular to operation of landing doors of elevator systems.

In an elevator configuration such as when one car door must open multiple landing doors on a certain floor, there can be constraints such as door opening width, door space and coupling location which complicates the operation of the doors. An example of this situation is one car door opening on a rotating cab accessing 3-4 landing doors per floor. If the multiple landing door openings per floor are close to one another, the required door space for each opening can overlap, making it complicated and expensive to provide a door system the functions and fits in the building layout.

SUMMARY

In one exemplary embodiment, a landing arrangement of an elevator system includes a plurality of landing bays, at least two landing bays of the plurality of landing bays overlapping, and a plurality of landing door sets. Each landing door set of the plurality of landing door sets corresponds to a landing bay of the plurality of landing bays. At least two landing door sets of the plurality of landing door sets are interconnected such that opening a first landing door set of the plurality of landing door sets urges the at least partial opening of a second landing door set adjacent to the first landing door set.

Additionally or alternatively, in this or other embodiments a closure element is configured to urge the second landing door set to a closed position when the first landing door set is closed.

Additionally or alternatively, in this or other embodiments the closure element is configured to automatically urge the second landing door set to the closed position.

Additionally or alternatively, in this or other embodiments each landing door set of the plurality of landing door sets includes two landing doors, and the two landing doors move in a same direction when moved between the closed position and an open position.

Additionally or alternatively, in this or other embodiments the plurality of landing bays are positioned about an arc relative to a central axis of the elevator system.

Additionally or alternatively, in this or other embodiments the plurality of landing bays is four landing bays.

In another exemplary embodiment, an elevator system includes an elevator shaft, an elevator car moveable along the elevator shaft and rotatable about a shaft central axis of the elevator shaft, and a landing arrangement. The landing arrangement includes a plurality of landing bays, at least two landing bays of the plurality of landing bays overlapping, and a plurality of landing door sets. Each landing door set of the plurality of landing door sets corresponds to a landing bay of the plurality of landing bays. At least two landing door sets of the plurality of landing door sets are interconnected such that opening a first landing door set of the plurality of landing door sets urges the at least partial opening of a second landing door set adjacent to the first landing door set.

Additionally or alternatively, in this or other embodiments the opening of the first landing door set is driven by opening of an elevator car door of the elevator car.

Additionally or alternatively, in this or other embodiments a closure element is configured to urge the second landing door set to a closed position when the first landing door set is closed.

Additionally or alternatively, in this or other embodiments the closure element is configured to automatically urge the second landing door set to the closed position.

Additionally or alternatively, in this or other embodiments each landing door set of the plurality of landing door sets includes two landing doors, and the two landing doors move in a same direction when moved between the closed position and an open position.

Additionally or alternatively, in this or other embodiments the plurality of landing bays are positioned about an arc relative to the central axis of the elevator shaft.

Additionally or alternatively, in this or other embodiments the plurality of landing bays is four landing bays.

In another exemplary embodiment, a method of operating an elevator system includes moving an elevator car along an elevator shaft to a landing floor. The landing floor includes a plurality of landing bays, at least two landing bays of the plurality of landing bays overlapping, and a plurality of landing door sets. each landing door set of the plurality of landing door sets corresponds to a landing bay of the plurality of landing bays. The elevator car is rotated about a central axis of the elevator shaft to a first landing door set of the plurality of landing door sets, and an elevator car door of the elevator car is urged toward the opened position. The first landing door set is urged open via the opening of the elevator car door, and the first landing door set is interconnected to a second landing door set adjacent to the first landing door set. The second landing door set is urged at least partially open via opening of the first landing door set.

Additionally or alternatively, in this or other embodiments a third landing door set adjacent to the second landing door set is urged at least partially open via opening of the second landing door set.

Additionally or alternatively, in this or other embodiments the first landing door set is moved to a closed position.

Additionally or alternatively, in this or other embodiments the second landing door set is moved to a closed position when the first landing door set is closed.

Additionally or alternatively, in this or other embodiments the second landing door set is automatically urged toward the closed position.

Additionally or alternatively, in this or other embodiments each landing door set of the plurality of landing door sets includes two landing doors, and the two landing doors move in a same direction when moved between the closed position and an open position.

Additionally or alternatively, in this or other embodiments the plurality of landing bays are positioned about an arc relative to the central axis of the elevator shaft.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
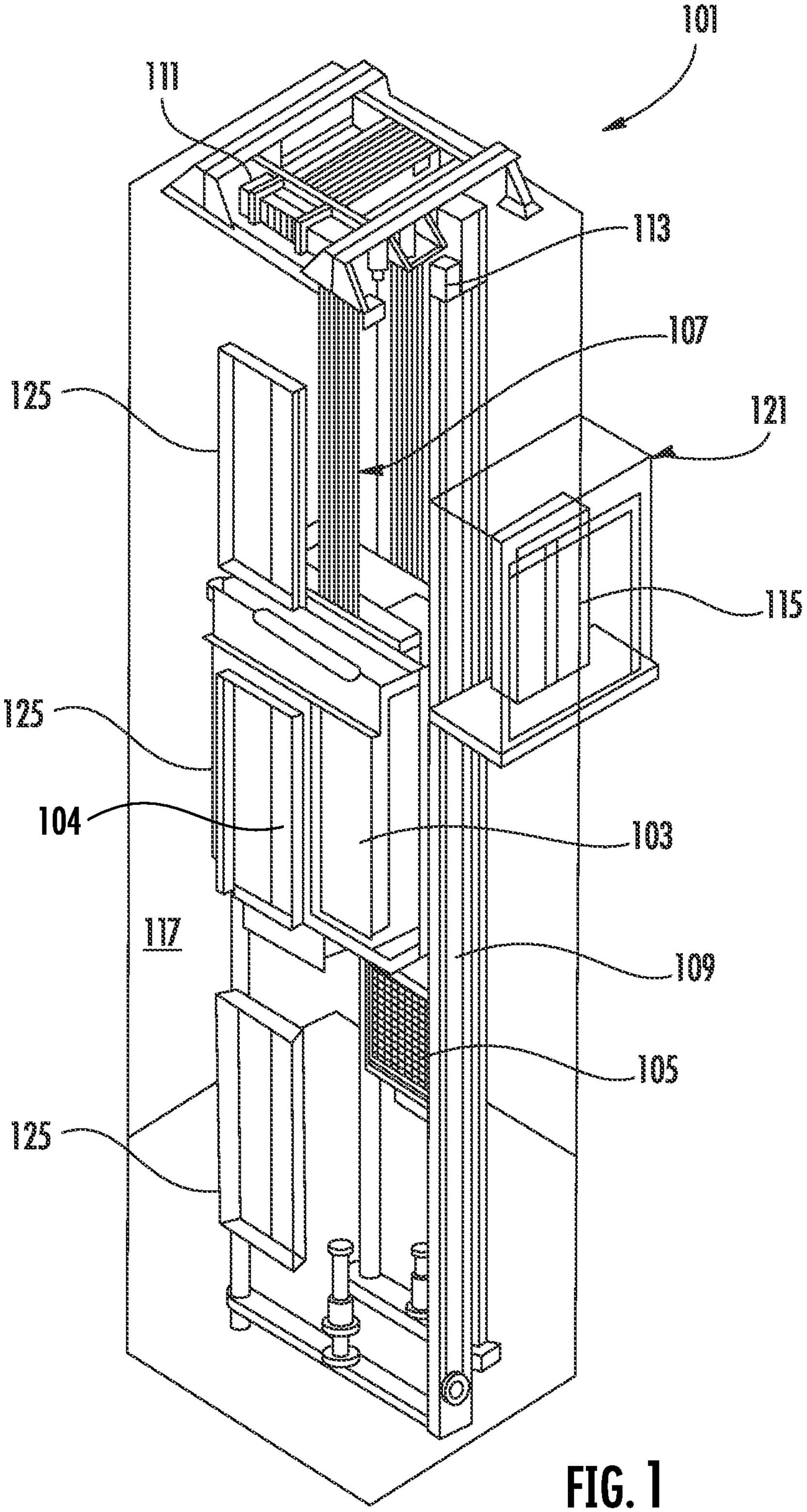
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft or hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 may be located, as shown, in a controller room 121 of the elevator shaft 117 and is configured to control the operation of the elevator system 101, and particularly the elevator car 103. It is to be appreciated that the controller 115 need not be in the controller room 121 but may be in the hoistway or other location in the elevator system. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller 115 may be located remotely or in a distributed computing network (e.g., cloud computing architecture). The controller 115 may be implemented using a processor-based machine, such as a personal computer, server, distributed computing network, etc.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

The elevator system 101 also includes one or more elevator doors 104. The elevator door 104 may be attached to the elevator car 103 or the elevator door 104 may be located on a landing 125 of the elevator system 101, or both. Embodiments disclosed herein may be applicable to both an elevator door 104 attached to the elevator car 103 or an elevator door 104 located on a landing 125 of the elevator system 101, or both. The elevator door 104 opens to allow passengers to enter and exit the elevator car 103.

Figure 2:
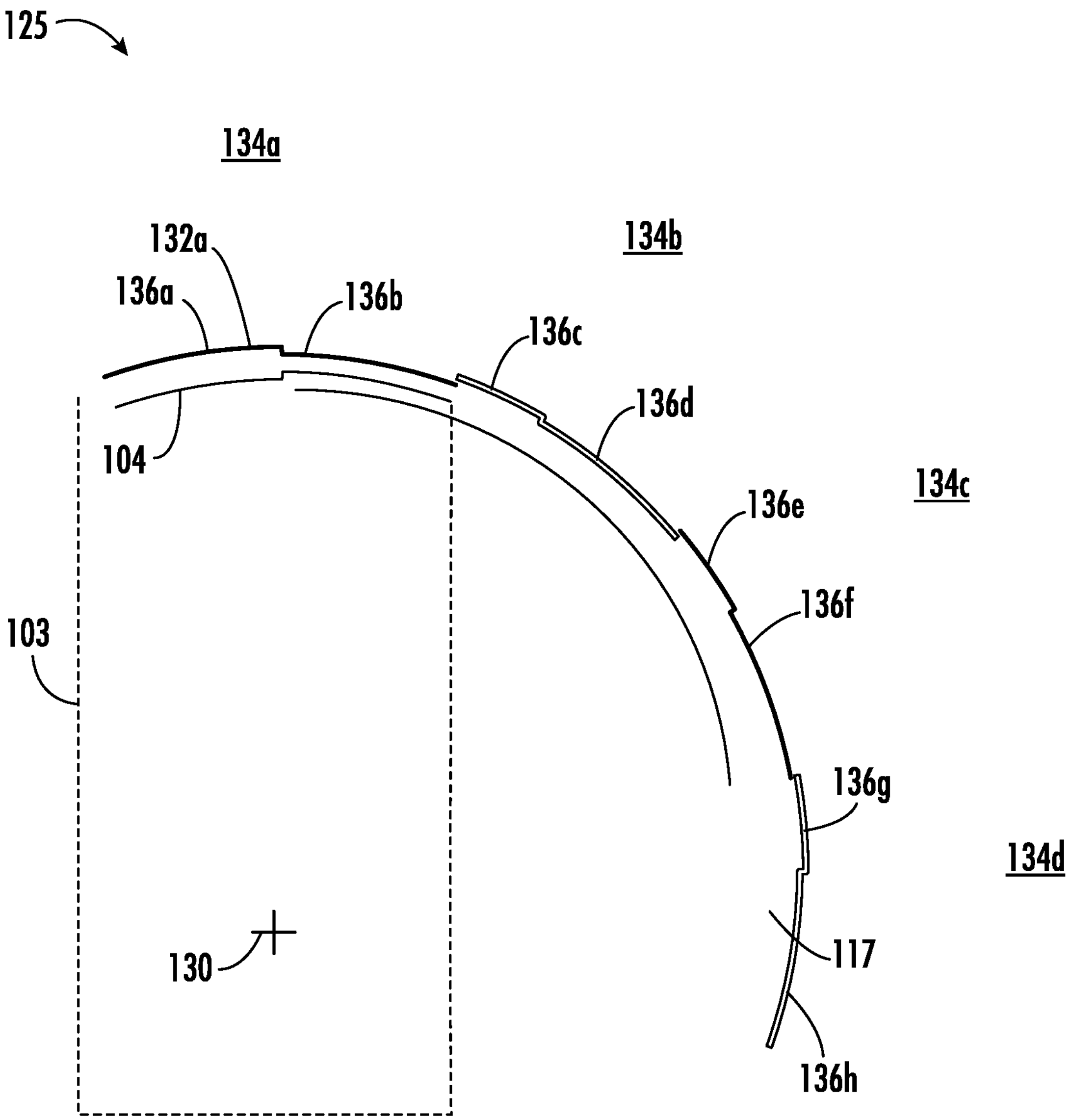
FIG. 2 is a schematic illustration of an embodiment of an elevator landing having multiple landing bays.

Referring now to FIG. 2, illustrated is an exemplary arrangement of a landing 125 of an elevator system 101. The elevator car 103 is located in the elevator shaft 117 and in some embodiments is configurated to rotate in the elevator shaft 117 about a shaft central axis 130. The elevator car 103 includes elevator doors 104 interactive with a one of a plurality of landing door sets 132. The landing door sets 132 are each located at a landing bay 134 of the landing 125, such that depending on a rotational position of the elevator car 103 and the elevator doors 104 relative to the shaft central axis 130 different landing door sets 132 are operated so that different landing bays 134 are utilized to load or unload passengers and/or goods or other objects.

The landing door sets 132 are generally arranged in an arc in the embodiment of FIG. 2, but this configuration is merely exemplary and one skilled in the art will readily appreciate that the present disclosure may be readily applied to other landing door sets 132 arrangements. In the arc arrangement as illustrated, widths of adjacent landing bays 134 of the plurality of landing bays 134 overlap at the landing door sets 132. For example, first landing bay **134*a* overlaps with adjacent second landing bay 134*b*, which also overlaps with adjacent third landing bay 134*c*. Similarly, third landing bay 134*c* overlaps with adjacent fourth landing bay 134*d*. While four landing bays 134 are illustrated and described herein, one skilled in the art will readily appreciate that the present disclosure may be similarly applied to elevator systems 101 with other quantities of landing bays 134 at a particular landing 125, such as two, three, five or more landing bays 134 at a particular landing 125**.

The illustration in FIG. 2 shows a state of the elevator system 101 where all of the landing door sets 132 are closed. The elevator car 103 is positioned about the shaft central axis 130 such that the elevator doors 104 are aligned to operate at the first landing bay **134*a*. Each landing door set 132 includes two landing doors 136. For example, first landing door set 132*a* at the first landing bay 134*a* includes landing doors 136*a* and 136*b*. Similarly second landing door set 132*b* located at the second landing bay 134*b* includes landing doors 136*c* and 136*d*, third landing door set 132*c* at third landing bay 134*c* includes landing doors 136*e*** and

136*f*, and fourth landing door set 132*d* at fourth landing bay 134*d* includes landing doors 136*g* and 136*h*.

Figure 3:
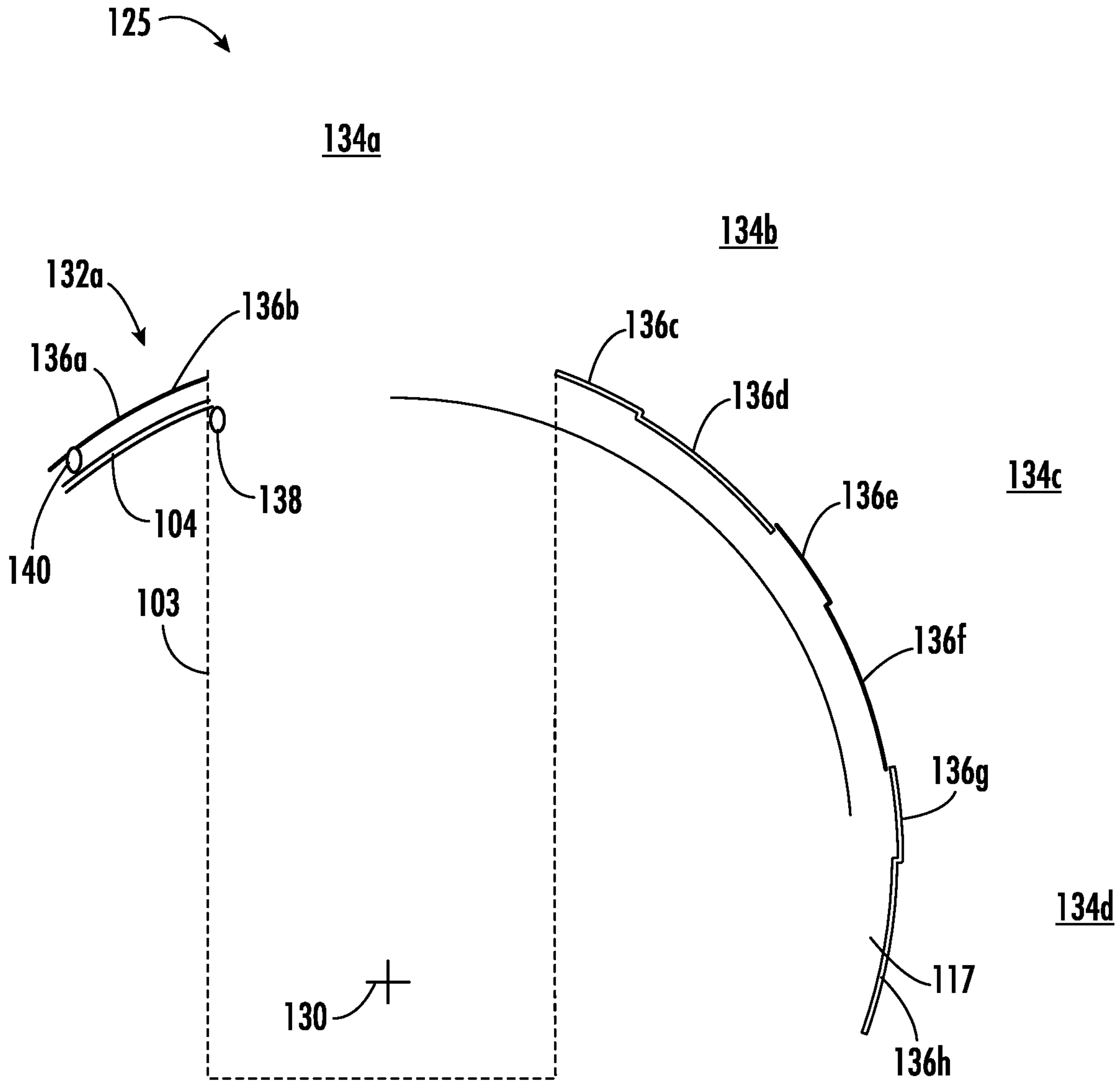
FIG. 3 is a schematic illustration of an embodiment of an elevator landing having multiple landing bays where a first bay is opened.

Referring to FIG. 3, to open the first landing door set 132*a* to utilize the first landing bay 134*a* for ingress into the elevator car 103 or egress from the elevator car 103, the elevator doors 104 at the elevator car 103 operably connect to the landing doors 136*a* and 136*b* via, for example, a door coupler 140 of the elevator doors 104. When the elevator doors 104 are urged open by a door mechanism 138, such as a door motor or the like, the landing doors 136*a* and 136*b* are urged toward an open position by the movement of the elevator doors 104 via the door coupler 140. The first door landing set 132*a* spans an entire width of the first landing bay 134*a*, so that when the landing doors 136*a* and 136*b* are in their opened position, such as shown in FIG. 3, access is gained to the first landing bay 134*a* from the elevator car 103.

Figure 4:
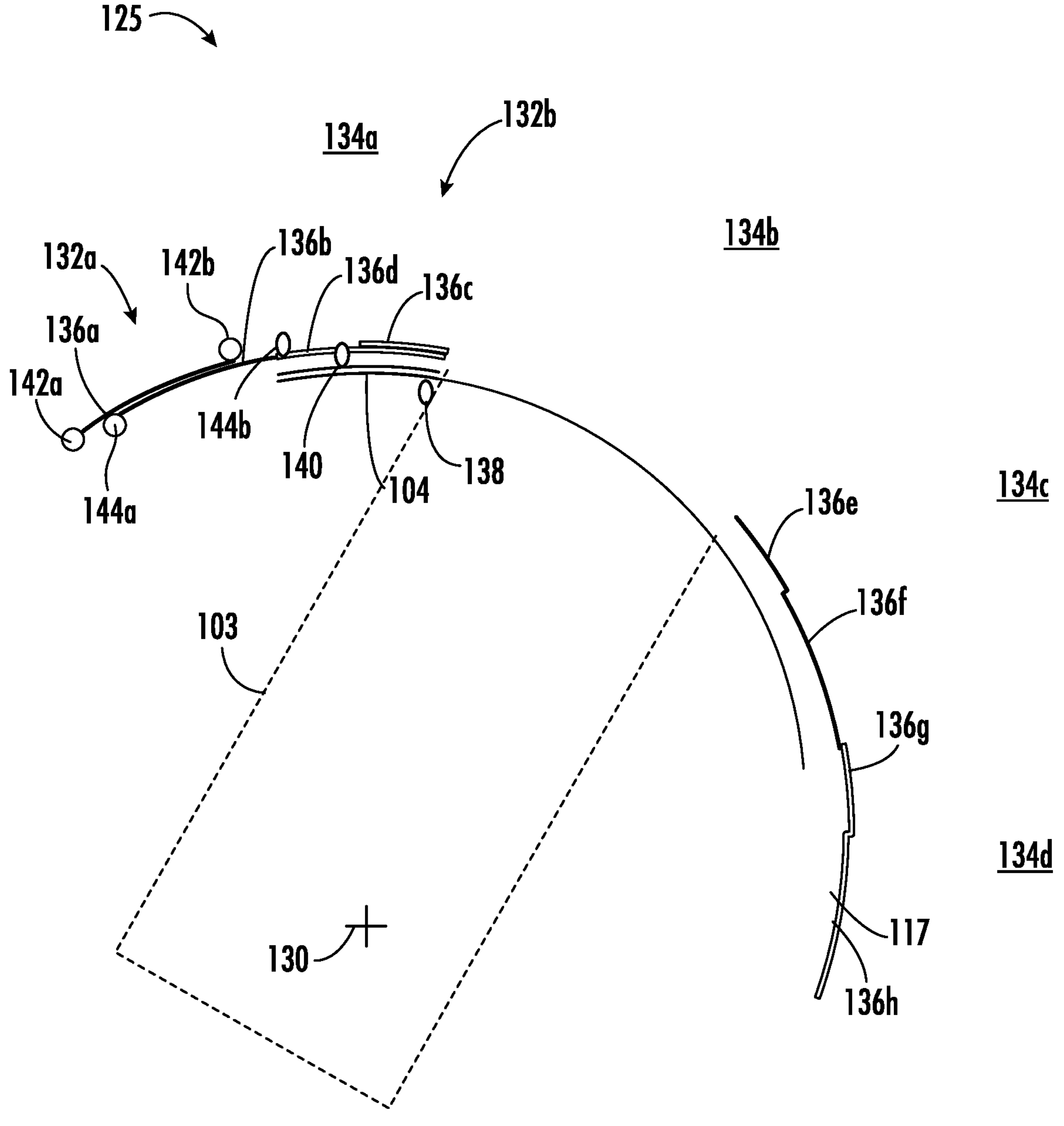
FIG. 4 is a schematic illustration of an embodiment of an elevator landing having multiple landing bays where a second bay is opened.

Referring now to FIG. 4, to utilize the second landing bay 134*b* for ingress into the elevator car 103 or egress from the elevator car 103, the elevator car 103 is moved so that the elevator doors 104 align with the second landing door set 132*b*. The landing doors 136*c* and 136*d* are operably connected to the elevator doors 104 via the door coupler 140. Operation of the elevator doors 104 via the door mechanism 138 urges the landing doors 136*c* and 136*d* toward their opened position. Since, however, the first landing bay 134*a* overlaps the second landing bay 134*b*, to allow full access between the second landing bay 134*b* and the elevator car 103, the first landing door set 132*a* must be moved at least partially to the opened position. In one embodiment, the landing door 136*d* is urged into contact with the landing door 136*b* of the first landing door set 132*a*. This contact unlocks the position of the landing door 136*b* via a first door interlock 142*a* and second door interlock 142*b*, and allows the movement of the landing door 136*d* to drive movement of the landing door 136*b* so that the second landing door set 132*b* can achieve the fully opened position as illustrated in FIG. 4.

To close the second landing door set 132*b*, the landing doors 136*c* and 136*d* are driven to the closed position, such as illustrated in FIG. 2, via the door coupler 140 by movement of the elevator doors 104. The landing door 136*b* may return to the closed position by movement of the landing door 136*d* via the door interlocks 142*a* and 142*b*, or alternatively may be urged to the closed position by a first closing element 144*a* operably connected to the landing door 136*b*. In some embodiments, the first closing element 144*a* may be, for example, a weighted closer or a spring.

Figure 5:
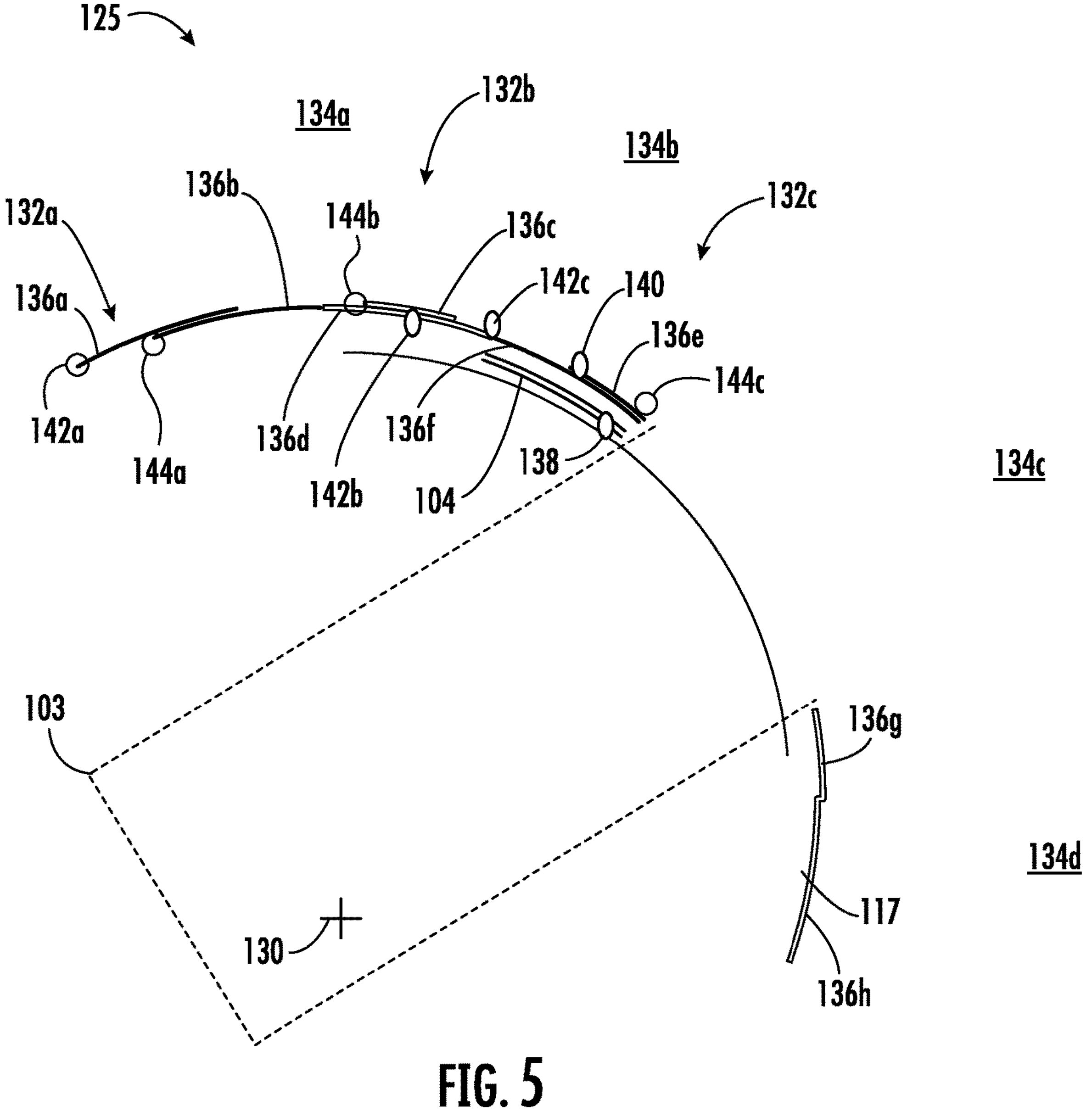
FIG. 5 is a schematic illustration of an embodiment of an elevator landing having multiple landing bays where a third bay is opened.

Referring now to FIG. 5, to utilize the third landing bay 134*c* for ingress into the elevator car 103 or egress from the elevator car 103, the elevator car 103 is moved so that the elevator doors 104 align with the third landing door set 132*c*. The landing doors 136*e* and 136*f* are operably connected to the elevator doors 104 via the door coupler 140. Operation of the elevator doors 104 via the door mechanism 138 urges the landing doors 136*e* and 136*f* toward their opened position. Since, however, the second landing bay 134*b* overlaps the third landing bay 134*c*, to allow full access between the third landing bay 134*c* and the elevator car 103, the second landing door set 132*b* must be moved at least partially to the opened position. In one embodiment, the landing door 136*f* is urged into contact with the landing door 136*d* of the second landing door set 132*b*. This contact unlocks the position of the landing doors 136*c* and 136*d* via a third door interlock 142*c*, and allows the movement of the landing door 136*f* to drive movement of the landing doors 136*c* and 136*d* so that the third landing door set 132*c* can achieve the fully opened position as illustrated in FIG. 5. In some embodiments, for the third landing door set 132*c* to reach the fully opened position, the landing door 136*d* may urge the landing doors 136*a* and/or 136*b* at least partially toward the open position as previously described above.

To close the third landing door set 132*c*, the landing doors 136*e* and 136*f* are driven to the closed position, such as illustrated in FIG. 2, via the door coupler 140 by movement of the elevator doors 104. The landing doors 136*a*, 136*b*, 136*c* and 136*d* may return to the closed position by movement of the landing door 136*f* via the door interlock 142*c*, or alternatively may be urged to the closed position by closing elements 144*a* and 144*b* operably connected to the landing doors 136*a*, 136*b*, 136*c* and 136*d*.

Figure 6:
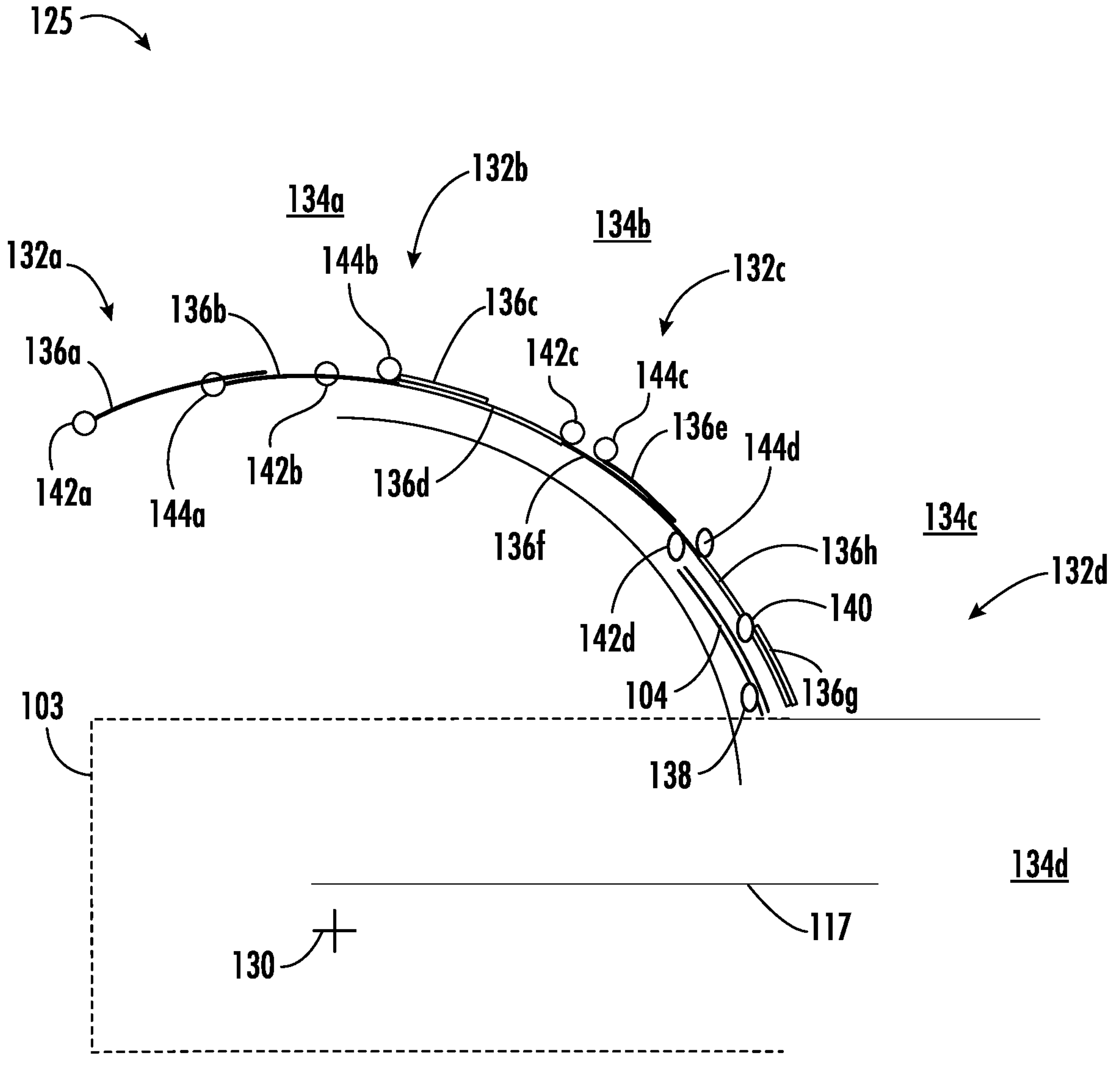
FIG. 6 is a schematic illustration of an embodiment of an elevator landing having multiple landing bays where a fourth bay is opened.

Referring now to FIG. 6, to utilize the fourth landing bay 134*d* for ingress into the elevator car 103 or egress from the elevator car 103, the elevator car 103 is moved so that the elevator doors 104 align with the fourth landing door set 132*d*. The landing doors 136*g* and 136*h* are operably connected to the elevator doors 104 via the door coupler 140. Operation of the elevator doors 104 via the door mechanism 138 urges the landing doors 136*g* and 136*h* toward their opened position. Since, however, the third landing bay 134*c* overlaps the fourth landing bay 134*d*, to allow full access between the fourth landing bay 134*d* and the elevator car 103, the third landing door set 132*c* must be moved at least partially to the opened position. In one embodiment, the landing door 136*h* is urged into contact with the landing door 136*f* of the third landing door set 132*c*. This contact unlocks the position of the landing doors 136*e* and 136*f* via a door interlock 142*d*, and allows the movement of the landing door 136*h* to drive movement of the landing doors 136*e* and 136*f* so that the fourth landing door set 132*d* can achieve the fully opened position as illustrated in FIG. 6. Additionally, it may be necessary to move the landing doors of the second landing door set 132*b* and the landing doors of the first landing door set 132*a* so that the fourth landing door set 132*d* may reach the fully opened position.

To close the fourth landing door set 132*d*, the landing doors 136*g* and 136*h* are driven to the closed position, such as illustrated in FIG. 2, via the fourth door coupler 138 by movement of the elevator doors 104. The landing doors 136*a*, 136*b*, 136*c*, 136*d*, 136*e* and 136*f* may return to the closed position by movement of the landing door 136*h* via the door interlock 142*d*, or alternatively may be urged to the closed position by a closing elements 144*a*, 144*b*, 144*c* operably connected to the landing doors 136*a*, 136*b*, 136*c*, 136*d*, 136*e* and 136*f*.

The landing door configuration and operation described herein reduces the complexity of opening multiple landing doors on the same floor occupying overlapping door space and eliminates the need for landing doors to travel in both directions in relation to close. Further, the cost of the elevator system may be reduced by having a traditional elevator door coupling device mounted to the car doors to open the landing doors, and eliminate the need for powered landing doors. Additionally, the configuration reduces variation of door components in the building.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A landing arrangement of an elevator system, comprising:

a plurality of landing bays, at least two landing bays of the plurality of landing bays overlapping; and a plurality of landing door sets, each landing door set of the plurality of landing door sets corresponding to a landing bay of the plurality of landing bays;

wherein at least two landing door sets of the plurality of landing door sets are interconnected such that opening a first landing door set of the plurality of landing door sets urges the at least partial opening of a second landing door set adjacent to the first landing door set;

wherein:

each landing door set of the plurality of landing door sets includes at least two landing doors; and the at least two landing doors move in a same direction when moved between the closed position and an open position.

2. The landing arrangement of claim 1, further comprising a closure element configured to urge the second landing door set to a closed position when the first landing door set is closed.

3. The landing arrangement of claim 2, wherein the closure element is configured to automatically urge the second landing door set to the closed position.

4. The landing arrangement of claim 1, wherein the plurality of landing bays are positioned about an arc relative to a central axis of the elevator system.

5. The landing arrangement of claim 1, wherein the plurality of landing bays is four landing bays.

6. An elevator system, comprising:

an elevator shaft;

an elevator car moveable along the elevator shaft and rotatable about a shaft central axis of the elevator shaft; and a landing arrangement, including:

a plurality of landing bays, at least two landing bays of the plurality of landing bays overlapping; and a plurality of landing door sets, each landing door set of the plurality of landing door sets corresponding to a landing bay of the plurality of landing bays;

wherein at least two landing door sets of the plurality of landing door sets are interconnected such that opening a first landing door set of the plurality of landing door sets urges the at least partial opening of a second landing door set adjacent to the first landing door set;

wherein:

each landing door set of the plurality of landing door sets includes at least two landing doors; and the at least two landing doors move in a same direction when moved between the closed position and an open position.

7. The elevator system of claim 6, wherein the opening of the first landing door set is driven by opening of an elevator car door of the elevator car.

8. The elevator system of claim 6, further comprising a closure element configured to urge the second landing door set to a closed position when the first landing door set is closed.

9. The elevator system of claim 8, wherein the closure element is configured to automatically urge the second landing door set to the closed position.

10. The elevator system of claim 6, wherein the plurality of landing bays are positioned about an arc relative to the central axis of the elevator shaft.

11. The elevator system of claim 6, wherein the plurality of landing bays is four landing bays.

12. A method of operating an elevator system, comprising:

moving an elevator car along an elevator shaft to a landing floor, the landing floor including:

a plurality of landing bays, at least two landing bays of the plurality of landing bays overlapping; and a plurality of landing door sets, each landing door set of the plurality of landing door sets corresponding to a landing bay of the plurality of landing bays;

rotating the elevator car about a central axis of the elevator shaft to a first landing door set of the plurality of landing door sets;

opening an elevator car door of the elevator car;

urging opening of the first landing door set via the opening of the elevator car door;

interconnecting the first landing door set to a second landing door set adjacent to the first landing door set; and urging at least partial opening of the second landing door set via opening of the first landing door set;

wherein:

each landing door set of the plurality of landing door sets includes at least two landing doors; and the at least two landing doors move in a same direction when moved between the closed position and an open position.

13. The method of claim 12, further comprising urging at least partial opening of a third landing door set adjacent to the second landing door set via opening of the second landing door set.

14. The method of claim 12, further comprising moving the first landing door set to a closed position.

15. The method of claim 14, further comprising moving the second landing door set to a closed position when the first landing door set is closed.

16. The method of claim 15, wherein the second landing door set is automatically urged toward the closed position.

17. The method of claim 12, wherein the plurality of landing bays are positioned about an arc relative to the central axis of the elevator shaft.

* * * * *